United States Patent [19]

Schaefer

[11] 4,325,012

[45] Apr. 13, 1982

[54] START WINDING CUT-OUT CIRCUIT FOR AN ELECTRIC MOTOR

[75] Inventor: Edward J. Schaefer, Bluffton, Ind.

[73] Assignee: Franklin Electric Co., Inc., Bluffton, Ind.

[21] Appl. No.: 21,268

[22] Filed: Mar. 15, 1979

Related U.S. Application Data

[63] Continuation-in-part of Ser. No. 3,357, Jan. 15, 1979, which is a continuation of Ser. No. 770,110, Feb. 18, 1977, abandoned, which is a continuation-in-part of Ser. No. 618,359, Oct. 1, 1975, abandoned.

[51] Int. Cl.³ .............................................. H02P 1/44
[52] U.S. Cl. .................................. 318/786; 318/783; 318/791
[58] Field of Search ................ 318/783, 784, 786–788, 318/791, 792

[56] References Cited

U.S. PATENT DOCUMENTS

| | | | |
|---|---|---|---|
| 3,213,239 | 10/1965 | Bodge | 318/783 |
| 3,307,093 | 2/1967 | Wright | 318/786 |
| 3,421,064 | 1/1969 | Phillips | 318/786 |
| 3,586,939 | 6/1971 | Buiting | 318/792 |
| 3,683,250 | 8/1972 | Fricker | 318/788 |
| 3,766,457 | 10/1973 | Fink, Jr. et al. | 318/786 |

Primary Examiner—Gene Z. Rubinson
Attorney, Agent, or Firm—Merriam, Marshall & Bicknell

[57] ABSTRACT

This disclosure deals with a time delay cut-out circuit for the start winding of an AC electric motor. The circuit includes an electronic switch which is connected in series with the start winding and which may be selectively closed to energize the start winding. Time delay means is provided which, in response to current flow therethrough, provides a timing period. An auxiliary coil is inductively coupled to the motor windings and supplies current to operate the time delay means. The time delay means operates the electronic switch to energize the start winding during the timing period. The components of the circuit, except for the coil, are mounted in a capsule which may be plugged into the motor from the exterior of the stator. The time delay means includes a self heating, heat responsive device, and the components are sized and arranged to optimize the heat generation and dissipation properties and thereby obtain the desired operating characteristics.

39 Claims, 16 Drawing Figures

START WINDING CUT-OUT CIRCUIT FOR AN ELECTRIC MOTOR

This application is a continuation-in part of my pending application Ser. No. 3,357, filed Jan. 15, 1979, which is a continuation of application Ser. No. 770,110, filed Feb. 18, 1977 now abandoned, which is a continuation-in-part of application Ser. No. 618,359 now abandoned, filed Oct. 1, 1975.

Prior art U.S. Pat. Nos. 3,832,612 and 3,643,142 describe various electronic control circuits for an AC induction motor having a main winding and a start winding. The control circuits include a triac connected in series with the start winding a timing circuit connected to the gate of the triac for turning it on, and thus energizing the start winding, for a certain time interval measured from initial energization of the motor. The timing circuit includes a PTC resistor which heats to its transition temperature during the time interval and turns off the triac when heated to above its transition temperature.

While circuits of this character operate satisfactorily, they have a number of disadvantages. Such circuits include a sizable number of components, which makes the circuits relatively expensive, increases their chance of failure, and makes them difficult to compactly package. Further, the length of time required for the transition of a PTC resistor from its low resistance state to it high resistance state is relatively long, this transition taking place over a number of cycles of the AC power supply. Since a triac normally is not a perfectly symmetrical device, halfwave operation often takes place during the transition. This is equivalent to introducing a direct current component in the power supply lines, which makes a motor having such a control circuit noisy during the transition interval.

It is a general object of the present invention to provide an improved control circuit which does not have the foregoing disadvantages.

It is a further object to provide an improved method of mounting such a control circuit in a motor.

A control circuit in accordance with the present invention is designed to control energization of the start winding of an AC motor which includes a main winding and a start winding. The control circuit includes switch means connected to the start winding, heat responsive means connected to the switch means and including a self-heating part, and a current source coupled to the motor windings, the current serving to heat the self heating part and to operate the switch means to control the start winding.

At least some of the components of the control circuit are contained in a capsule which may be plugged into the motor from the exterior of the stator, thus making the circuit readily accessible for replacement or servicing without dismantling the stator. The trigger circuit includes that responsive parts, and the physical layout of the electrical components in the capsule provides optimum heat generation and dissipation from the parts and optimum operating characteristics of the circuit.

The foregoing and other objects and features of the present invention may be better understood from the following detailed description taken in conjunction with the accompanying figures of the drawings, wherein.

Figure 1:
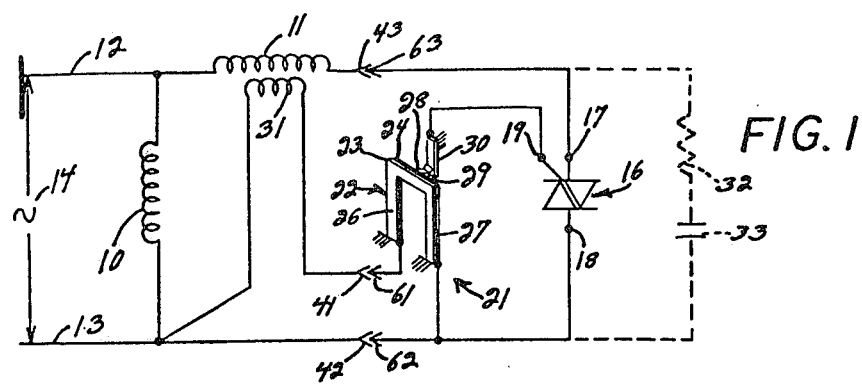
FIG. 1 is a schematic diagram of a control circuit in accordance with the invention.

FIG. 1 schematically illustrates an AC electric motor of the split-phase induction type, including a main winding 10 and a start winding 11. The two windings 10 and 11 are wound on the stator (not shown) of an electric motor and are angularly displaced by 90 electrical degrees. As is well known to those skilled in the art, starting torgue for the motor is attained by providing the start winding 11 with a different phase angle from the main winding 10, thereby producing a time or phase displacement between the two windings. One side of each of the windings 10 and 11 is connected to a power supply line 12, and the other side of the main winding 10 is connected to a power line 13. The two lines 12 and 13 are adapted to be connected to an AC power supply 14 such as a 60-cycle single phase AC power source.

While the main winding 10 is connected directly across the two power supply lines 12 and 13, the start winding 11 is connectable across the two supply lines by a control circuit which enables energization of the start winding 11 during a short timing interval or period at initial energization of the motor. This time interval may, for example, be one-half second in length. As will be described hereinafter, the start winding 11 may also be reenergized if the motor stalls. The control circuit comprises a selectively closable bi-directional electronic switch such as the type commonly known as a triac, indicated by the reference numeral 16. The triac 16 comprises a first main or power terminal 17, a second main or power terminal 18, and a gate 19. The triac 16 offers a low resistance path between the main terminals 17 and 18, when in each AC half cycle, a potential appears across the main terminals and a trigger signal appears on the gate 19. The triac 16 otherwise presents a very high resistance, or open circuit to current flow between the main terminals 17 and 18. The main terminal 17 is connected to the start winding 11 and the other main terminal 18 is connected to the power line 13. It will be apparent therefore that the start winding 11 and the triac 16 are connected in series and they are connected across the power lines 12 and 13 in parallel with the main winding 10, and when the triac 16 is closed or triggered, the start winding 11 will be energized.

A trigger circuit 21 is also provided in the control circuit to trigger the triac 16 into conduction. The trigger circuit 21 comprises a bimetallic thermally responsive member 22 which, in the present illustration, is generally U-shaped. The member 22 comprises two layers 23 and 24 of metals which have different rates of thermal expansion, as is well known in the art. The lower ends of the legs 26 and 27 of the member 22 are fixed or held stationary, and a movable contact 28 is secured to the web or cross portion of the member 22. A stationary or fixed contact 29 is positioned adjacent the member 22 and the contacts 28 and 29 are normally closed. However, when the member 22 is heated, it flexes and moves the contact 28 away from and out of engagement with the fixed contact 29.

While the contact 29 is referred to herein as a fixed contact, it may also be movable to some extent. The contact 29 may be fastened to a flexible bimetal member 30 which moves the contact 29 in the same direction as the contact 28 when heated. This arrangement compensates for changes in ambient temperature without otherwise affecting the operation of the circuit.

The fixed contact 29 is electrically connected to the gate 19 of the triac 16. The leg 27 of the member 22 is electrically connected to the main terminal 18 of the triac 16 and the other leg 26 is electrically connected to a current source which in the present instance comprises an auxiliary coil 31. The coil 31 is connected between the leg 26 and the power line 13, and it will be apparent that when a voltage is induced in the coil 31, current will flow through the loop including the coil 31, the bimetallic member 22, the line 13, and return to the coil 31. The coil 31 is mounted on the motor stator concentric with or on the axis of the start winding 11.

In addition to the foregoing circuit components, a snubbing resistor 32 and capacitor 33 may be connected across the main terminals 17 and 18 of the triac 16 to prevent self-triggering of the triac, as is well known in the art.

Considering the operation of the circuit illustrated in FIG. 1, when the power lines 12 and 13 are connected to an AC power supply, current flows through the main winding 10. Initially, the member 22 is cool and the contacts 28 and 29 are in electrical engagement. In a particular half cycle of the supply voltage, as the supply voltage crosses zero and starts to increase, substantially the full line potential appears across the main terminals 17 and 18 of the triac 16. The potential across the main terminals results in current flow from the main terminal 17, through the internal triac resistance between the terminal 17 and the gate 19, through the contacts 28 and 29, the member 22 and to the power line 13. As the supply voltage increases in the AC half cycle, the current flow between the terminal 17 and the gate 19 increases and the potential across the terminals 17 and 18 also increases. When the gate current reaches, for example, 20 to 30 milliamps, the triac 16 is triggered on and full start winding current flows through the winding 11 and the triac 16. This occurs very early in the half cycle, and current flow continues until the end of the AC half cycle, but the triac 16 turns off at the next zero crossing. Of course, the foregoing series of events occurs once again during the next AC half cycle and continues until the contacts 28 and 29 open to break the path of current flow through the gate 19. While this gate current flows through the member 22, it is not sufficient to materially heat the member 22. Once the triac 16 fires, the current through the gate 19 is limited because of the short circuit formed by the triac main terminals. The only voltage across the gate 19 is the triac forward voltage drop which of course is very low. Therefore there is no need for a gate resistor as is usually required in conventional circuits. Damaging current surges in the gate circuit are prevented by the start winding 11 inductance.

As shown in FIG. 1, the auxiliary coil 31 is mounted concentrically with or on the axis of the start winding 11, and consequently current flowing through the start winding 11 induces a voltage in the coil 31. The induced voltage results in current flow through the coil 31 and the legs 26 and 27 of the member 22.

This current results in resistance or self-heating of the two layers 23 and 24 of metal of the member 22, and after a time interval or period, the member 22 is heated sufficiently that it flexes and opens the normally closed contacts 28 and 29. The length of the time interval or period is determined primarily by the size and mass of the member 22, the types of metal, the number of turns of the coil 31, and the amount of heat lost from the member 22. This length is chosen to coincide with the length of time required for the motor to reach the normal cut-out speed when driving the load for which the motor is designed. For a motor designed to drive a water well pump for example, the cut-out speed is reached at the end of approximately 0.5 second. As will be discussed hereinafter, the layout or mounting of the components has an effect on the time interval because the layout determines the amount of heat lost from the member 22. The circuit components may also be arranged to make the circuit respond to the motor speed, as will also be discussed hereinafter.

As previously mentioned, the contacts 28 and 29 open at the end of the time interval. Thereafter, the bimetallic member 22 is maintained in its heated condition in order to hold the contacts open by reason of the voltage induced in the coil 31 and the resultant current flow through the member 22. During running of the motor, the turning rotor induces current in the coil 31 and this induced current is sufficient to maintain the element 22 in the heated condition and to hold the contacts 28 and 29 open.

At the time when the contacts 28 and 29 open, the only current flow through them is the residual current flow in the gate 19 circuit after the triac has fired, which is extremely low. Consequently, the contacts 28 and 29 may be made very small and will last a long time.

Figure 7:
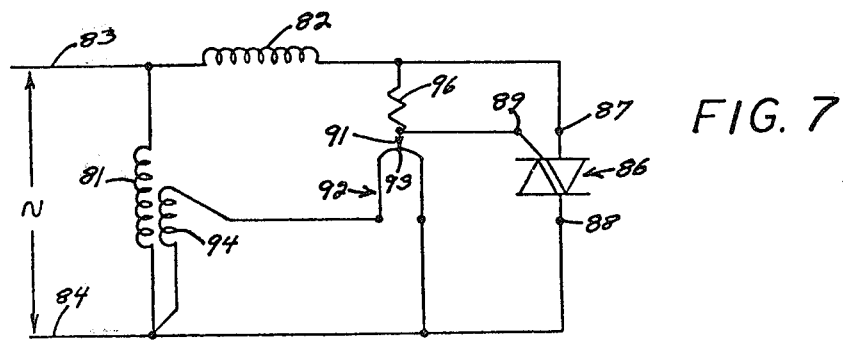
FIG. 7 is a schematic diagram similar to FIG. 1 but illustrating an alternate form of the invention.
Figure 8:
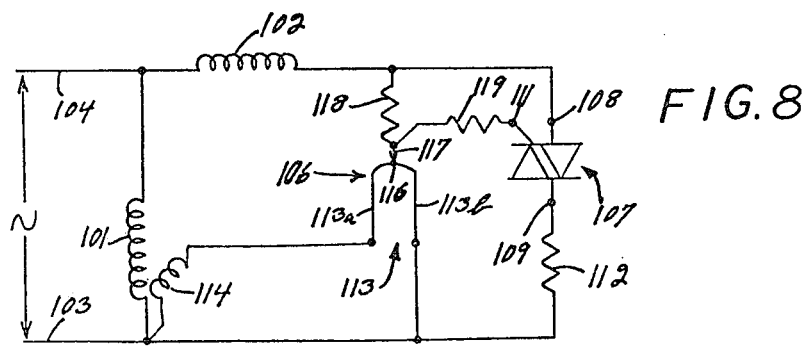
FIG. 8 is a schematic diagram similar to FIGS. 1 and 6 but illustrating still another alternate form of the invention.
Figure 14:
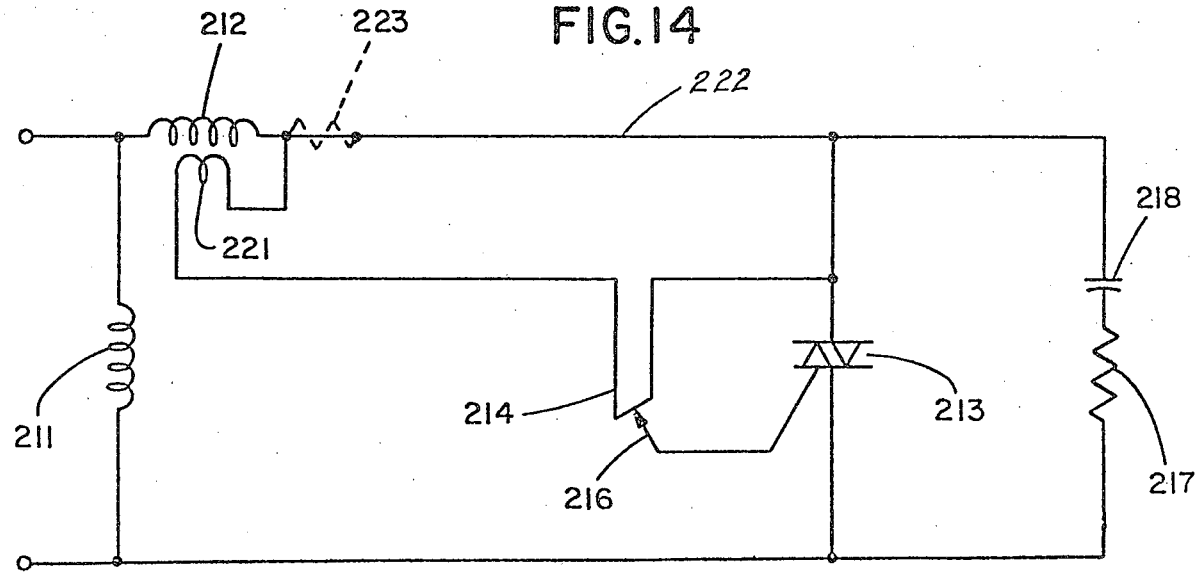
FIG. 14 is a schematic diagram similar to FIG. 1 but showing still another alternate form of the invention.
Figure 15:
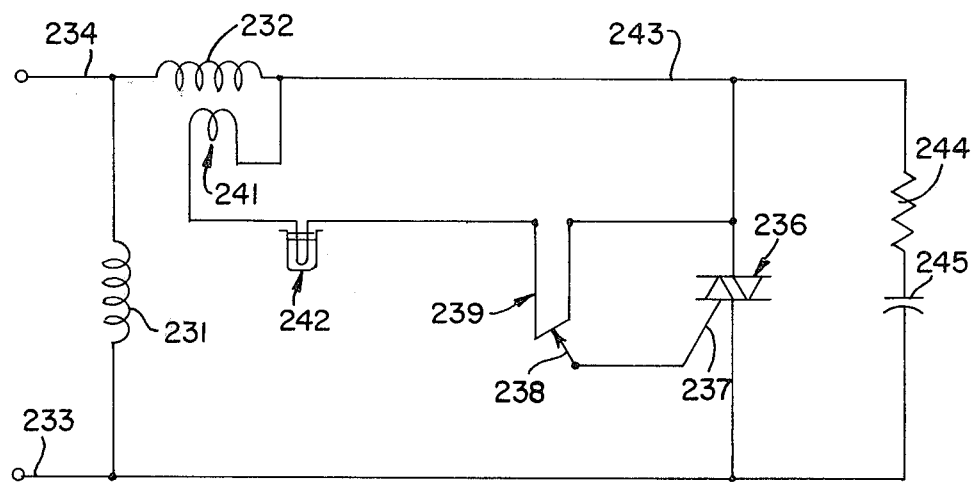
FIG. 15 is a schematic diagram of still another and preferred form of the invention.

While the auxiliary coil 31 may be inductively coupled with the start winding 11 as shown in FIGS. 1 and 14, or with the main winding 10 as shown in FIG. 7, or in a position in between as shown in FIG. 8, the poisition illustrated in FIGS. 1, 14, and 15 is preferred for most motor applications. In the event that the motor is stalled, the main winding 10 will continue to be energized but the rotor will not turn and current will no longer be induced in the coil 31. As soon as current stops flowing through the auxiliary coil 31 and the member 22, the member 22 begins to cool. When it cools sufficiently, the cntacts 28 and 29 again close and the start winding 11 will be reenergized due to triggering or firing of the triac 16 as previously described. Normally the motor will start up again and the member 22 will be heated and the timing interval will be repeated. Of course, an overload device should be provided between the lines 12 and 13 to protect the motor against damage in the case where the motor continues to be stalled after the start winding is reenergized.

The circuit of FIG. 1 has numerous advantages. The bimetal member 22 may be made very small because it carries only a small proportion of the start winding current. With such a small size it will have little thermal inertia, and consequently the member 22 will heat rapidly and it will cool relatively rapidly if the motor is stalled in order to trigger the triac 16 and reenergize the start winding. By way of a specific example, the total length of the legs 26 and 27 may be approximately one-quarter inch long, and the overall width of the member 22 in the other direction may be approximately one-eighth inch. The two layers 23 and 24 may be made extremely thin.

A further advantage derived from the small size of the bimetal member 22 is that little current is required to heat it. The coil 31 may consist of one or a few turns around several teeth of the stator which provides sufficient current to heat the member 22 and to maintain it heated after the contacts 28 and 29 open. To prevent damage to the member 22 from overheating after the contacts 28 and 29 open, heat sinks and the other circuit components may be mounted adjacent the member 22. Such heat sinks and components would not materially affect operation during initial energization however because the member 22 heats so quickly that it does not lose an appreciable amount of heat.

A still further advantage of the circuit is due to the fact that, at the instant of initial energization of the motor, the full power supply voltage is applied across the contacts 28 and 29, and consequently there is no problem due to failure to make adequate electrical contact. Nevertheless, there is no problem due to current buildup in the gate 19 circuit because the current is limited by the rapid energization of the triac 16, thereby preventing damage to the contacts 28 and 29.

Figure 4:
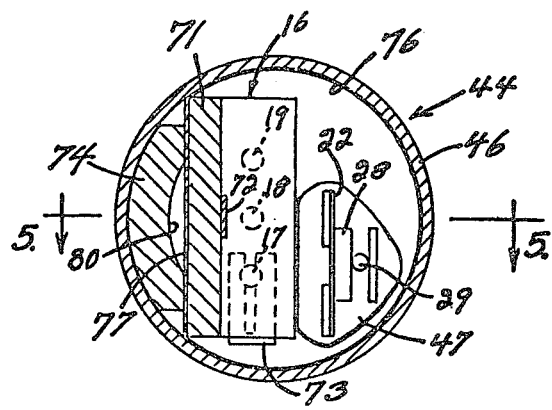
FIG. 4 is a view taken on the line 4—4 of FIG. 5.
Figure 5:
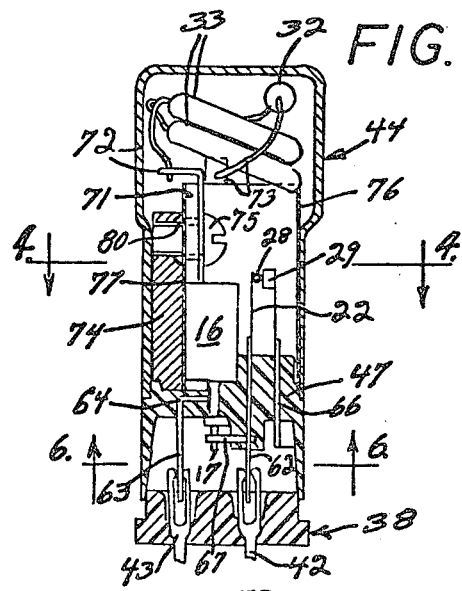
FIG. 5 is a sectional view taken on the line 5—5 of FIG. 4.
Figure 6:
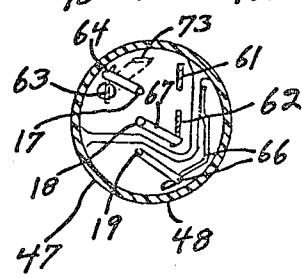
FIG. 6 is a sectional view taken on the line 6—6 of FIG. 5.

FIGS. 2–6 illustrate one method of mounting the components of the control circuit and the installation of the control circuit in an electric motor. The parts illustrated in FIGS. 5 and 6 are approximately twice actual size in a typical embodiment of the invention.

Figure 2:
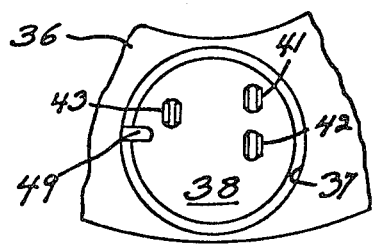
FIG. 2 is a view of a part of an electrical motor including a control circuit embodying the present invention.
Figure 3:
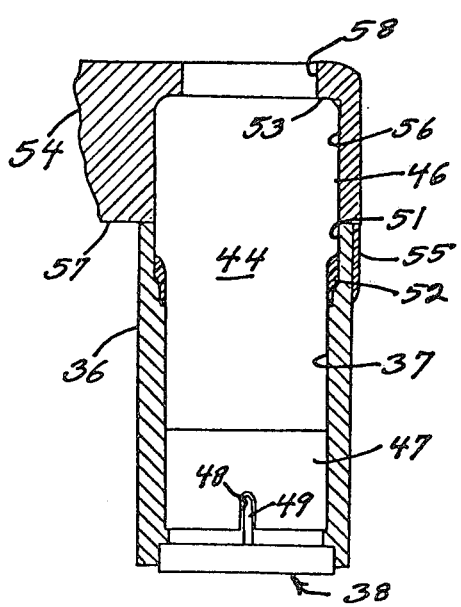
FIG. 3 is a fragmentary sectional view of a part of the motor.

With reference to FIGS. 2 and 3, the reference numeral 36 illustrates an annular end ring of a stator of an induction motor, the end ring closing one end of a stator cavity which houses the stator windings (not shown). The end ring 36 has a hole 37 formed therethrough, and the end of the hole 37 which is adjacent the stator cavity receives a connector part 38 (FIGS. 3 and 5). The support 38 is secured to the stator at the inner end of the opening 37 and supports three female connectors or sockets 41, 42 and 43 which extend downwardly into the cavity. FIG. 1 schematically illustrates the sockets and as shown the socket 41 is connected to the auxiliary winding 31, the socket 42 is connected to the main winding 10, and the socket 43 is connected to the start winding 11.

The opening 37 in the end ring 36 receives a capsule 44 (FIGS. 3 to 5) which houses the electrical components of the control circuit. The capsule 44 comprises a generally cylindrical housing 46 which is closed at its upper end and open at its lower end, and a connector base 47 which is fastened in the open lower end of the housing 46. As shown in FIGS. 2 and 3, a vertically extending slot 48 is formed on the base 47 and extends upwardly from the lower side of the base at one side thereof, and a polarizing projection 49 (FIG. 3) is formed on the connector part 38, which is adapted to be received in the slot 48. As shown in FIG. 3, to ensure proper alignment of prongs on the capsule 44 with the sockets 41 to 43, the capsule 44 is positioned with the slot 48 over the projection 49, and the capsule is then pressed downwardly into place.

With reference to FIG. 3, the upper portion 51 of the hole 37 is enlarged and the upper portion of the housing 46 is also enlarged. The upper and lower portions of the housing 44 fit snugly into the upper and lower portions of the hole 37. A sealing ring 52 is positioned in the hole 37 at the lower end of the enlargement 51, and when the capsule 44 is pressed into the hole 37, the sealing ring 52 is compressed and forms a seal between the capsule 44 and the end ring 36.

The electric motor further includes an end bell 54 (FIG. 3) having a hole 56 formed therein in alignment with the end ring hole 37. A thin cylindrical shell 55 is preferably also provided to cover the exterior of the stator.

The capsule 44 is held securely in the holes 37 and 56 as by a shoulder 53 (FIG. 3) which is formed on the inner periphery of the hole 56 and extends inwardly over the upper end of the capsule 44. The hole 56 has an internal dimension which is equal to the enlarged part 51 of the hole 37, and the vertical dimension of the end bell is great enough that the upper end of the housing 46 is recessed below the upper surface of the end bell 54. While the hole 56 may be a blind hole extending upwardly from the lower surface 57 of the end bell, FIG. 3 illustrates an arrangement where a hole 58 is formed concentrically with the hole 56 and extends from the hole 56 upwardly to the upper surface of the end bell 54. With this arrangement, the upper end of the capsule 44 is exposed to the ambient temperature and it can dissipate heat. The housing 46 preferably has a close fit with the end bell 54 and the end ring 36 so that the latter members can conduct heat from the housing 46.

The mounting of the electrical components shown in FIG. 1 is illustrated in FIGS. 4 to 6. The stationary contact 29, the bimetal member 22, and the triac 16 are supported on the base 47. The two terminals 17 and 18 and the gate 19 of the triac 16 are in the form of three prongs which extend downwardly from the body of the triac. Three prongs 61, 62 and 63, which are electrically connected to the circuit components extend downwardly from the base 47 and mate with the three sockets 41, 42 and 43. The prongs 61 and 62 are electrically connected to the two legs of the bimetal member 22, and the prong 63 is electrically connnected by a lead 64 to the main terminal 17 of the triac 16. The gate 19 is connected by leads 66 to the stationary contact 29, the main terminal 18 is connected to prong 62 by a lead 67. The main terminal 18, in addition to being connected to one of the downwardly extending prongs shown in FIG. 6, is also connected to an upwardly extending mounting tab of the triac 16, indicated by the numeral 71 (FIG. 5). Where the snubbing resistor 32 and capacitor 33 are provided, they are mounted above the other components and are connected by leads 72 to the tab 71 and by leads 73 (FIGS. 5 and 6) to the prong 63.

The tab 71 of the triac 16 is fastened to a metal heat sink 74 by a screw 75 which extends through a hole in the tab 71. The part 38 and the support 47 are of course made of an insulating material. The sink 74 is supported by the base 47 and is made of a good heat conducting material such as copper. The housing 46 is made of a metal, such as copper, and it is separated from some of the components by a generally cylindrical member 76 which is made of a good heat conducting material, but which is also an electrical insulator. The member 76 extends from the base 47 upwardly to the capacitor 37, and it is positioned around the contact 29, the member 22 and the triac 16. The member 76 extends to and is part of a thin layer 77 of insulation between the traic 16 and the sink 74. As shown in FIG. 4, the outer side of the sink 74 is curved, and the cylindrical portion of the member 76 and the sink 74 are in tight engagement with the housing 46 for good heat conductivity. The very thin layer 77 of insulation separates the triac from the sink 74, but heat conducts through the layer 77 because of its thinness. The adjacent surfaces of the tab 71 and the sink 77 are flat except for a countersink 80 in the sink 74 around the hole for the screw 75, and the tab 71 and the sink 74 are in good heat conducting relation through the insulation member 77.

As will be apparent from FIGS. 2-6, the capsule 44 is protected against damage by being recessed into the motor. By first removing the end bell 54, the capsule 44 may be readily removed for testing or servicing, without requiring complete disassembly of the motor. A still further advantage of mounting the control circuit outside the motor stator is that this location reduces the effect on the circuit operation, of the heat generated by the motor windings 10 and 11. At the exterior location shown, the bimetal member 22 will be influenced by the ambient temperature and therefore, if the motor is stalled, the metal 22 will cool much more rapidly than if the member 22 were mounted in the motor stator.

Since the bimetal member 22 is mounted closely adjacent the base 47 and the other components, particularly the triac 16, heat leaked from the member 22 and absorbed by the other parts will prevent damage to the member 22 after the start winding has been deenergized. The member 22 is very small and it is supported by conductors 61, 62 and 66 closely adjacent the base 47, and consequently heat from the member 22 will be conducted to the base and dissipated. The member 22 flexes in the direction of the triac 16 which also acts as a heat sink, and as the member 22 flexes, more of its heat will be radiated to the triac. If necessary to protect the member 22 or to achieve the desired speed of operation, other heat sinks in addition to the triac and the sink 74 may be mounted adjacent the member 22. For example, a copper heat sink could be mounted where it would be engaged by the member 22 after it has been heated. As a specific example, when from one to two amps. current flow through the member 22 it will be heated to the contact opening temperature in 0.5 second, but sufficient heat will be leaked from the member 22 that it will not be heated to above the temperature where it will be damaged. Upon initial energization the member 22 is heated so quickly that little heat is lost, but during continuous operation, a balance is maintained between the energy into the member 22 and the heat dissipated.

FIG. 7 illustrates an alternate form of control circuit for use with an electric motor including a main winding 81 and a start winding 83 which are connected to AC power supply lines 83 and 84. The start winding 82 is connected in series with a triac 86 and across a main winding 81. The triac 86 includes a main terminal 87 which is connected to the start winding 82, another main terminal 88 which is connected to the power supply line 84, and a gate 89 which is connected to a stationary contact 91 of a time delay circuit. A U-shaped thermal member 92 having a movable contact 93 is positioned adjacent the stationary contact 91, the member 92 and the contacts 91 and 93 being generally similar to the member 22 and the contacts 28 and 29 illustrated in FIG. 1. The bimetal member 92 is connected to an auxiliary coil 94 and to the power supply line 84, the auxiliary coil 94 in this embodiment of the invention being mounted on the stator concentrically with or on the axis of the main winding 81. A resistor 96 connects the stationary contact 91 with the junction between the start winding 82 and the triac terminal 87.

Considering the operation of the form of the invention illustrated in FIG. 7, the circuit will operate generally similar to that of the FIG. 1 circuit except that the bimetal member 92 will be heated both by current generated in the auxiliary coil 94 and also by current flowing through the start winding 82. Consequently, the member 92 may be heated more quickly than the member 22 of the FIG. 1 circuit. At the instant the motor is energized by connecting the power lines 83 and 84 to an AC power supply, current flows through the main winding 82 and current will also flow through the start winding 82, the resistor 96, the contacts 91 and 93, the two legs of the bimetal member 92 and to the power supply line 84. The voltage drop or potential across the resistor 96 produces triac triggering current which flows through the gate 89 of the triac 86 and thus triggers the triac 86 into conduction in each AC half cycle. As soon as the triac 86 starts to conduct, nearly all of the start winding current flows through it, the resistor 96 and the bimetal member 92 being essentially shorted by the triac but the bimetal member 92 continues to be heated by current which is induced in the auxiliary coil 94. Thus, the bimetal member 92 is heated both by a portion of the start winding current and by current from the auxiliary coil 94.

As soon as the bimetal member 92 has been sufficiently heated, the bimetal member 92 moves the contact 93 out of engagement with the fixed or stationary contact 91 and the triac 86 ceases to be triggered into conduction because of the loss of the potential across the resistor 96. Further, since the contacts 91 and 93 are out of engagement, start winding current no longer flows through the path previously formed by the resistor 96 and the bimetal member 92. Even though the start winding current no longer heats the bimetal member 92, the current induced in the auxiliary coil 94 is sufficient to maintain the bimetal member 92 in heated condition and hold the two contacts 91 and 93 separated. In some cases, more current is required to open the contacts than is required to hold them open, and in this construction adequate current is provided for both stages of operation. When the contacts 91 and 93 open, the triac 86 is conducting and substantially all of the start winding current flows through the triac. The amount of current flowing through the contacts 91 and 93 when they open is therefore very low, and consequently the contacts may have a very small size and will have a long life.

In the event the motor is stalled, current will continue to flow through the main winding 81 and consequently current will be induced in the auxiliary coil 94. The bimetal member 92 will continue to be heated by the induced current and the contacts 91 and 93 will be held out of engagement. Therefore, an overload device (not shown) should be provided to prevent continued energization of the motor which might overheat and damage the motor.

In the circuit shown in FIG. 7, it will be noted that the current induced in the auxiliary coil 94 will flow in the loop formed by the coil 94 and both legs of the bimetal member 92. The direction of current flow in one of the two legs will be opposed to that of the start winding current flowing through the resistor 96 and the bimetal member 92, and the direction of current flow through the other of the two legs will be added to the start winding current. To prevent uneven heating of the two legs of the bimetal member in such circumstances, the circuit shown in FIG. 8 may be utilized. The FIG. 8 circuit comprises a motor including a main winding 101, a start winding 102, power supply lines 103 and 104, and a control circuit 106. Once again, the control circuit comprises a triac 107 connected in series with the start winding 102 and across the main winding 101, the triac 107 including main terminals 108 and 109, and a gate 111. A resistor 112 is also connected in series with the start winding 102 and the triac 107. The gate 111 is connected to receive triggering current from a delay circuit including a bimetal element 113 which has one leg 113b connected to the power supply line 103 and the other leg 113a connected to an auxiliary coil 114, the other side of the coil 114 also being connected to the line 103. A stationary or fixed contact 117 is positioned adjacent the bimetal member 113, and a movable contact 116 is fastened to the bimetal member 113. A resistor 118 connects the fixed contact 117 with the start winding 102, and another resistor 119 connects the fixed contact 117 with the gate 111.

The auxiliary coil 114 is wound on the stator such that it has an angular displacement from the main winding 101, and it is electrically between the motor windings 101 and 102. The winding 114 is located on the stator at the point where the current it causes to flow through the two legs of the member 113 is as closely as possible 90° in phase angle displacement from the phase angle of the start winding current flowing through the legs of the member 113. The coil 114 may be located such that its current either leads or lags the start winding current by 90°.

Considering the operation of the circuit shown in FIG. 8, upon initial energization of the motor by connecting the power supply lines 103 and 104 to a source of AC power, AC current flows through the main winding 101. Current also flows through the start winding 102, the resistor 118, the two legs 113a and 113b of the number 113 to the line 103. Some current also flows through the gate circuit of the triac 107 because of the drop across the resistor 118 and this gate current serves to trigger the triac, as previously explained. In addition, current is induced in the auxiliary coil 114 and this current flows through the loop comprising the coil 114, the two legs 113a and 113b of the bimetal member 114, and the power supply line 103.

In a particular AC half cycle, start winding current flows from the start winding 102, through the resistor 118, and through both legs 113a and 113b to the line 103. The current caused by the coil 114 will flow from the coil 114, through the leg 113a, the leg 113b, the line 103 and return to the coil 114. If the start winding current and the auxiliary coil current were in phase, the auxiliary coil current would add to the start winding current in one of the legs of the member 113 and subtract from the start winding current in the other of the two legs and different amounts of current would flow in the two legs 113a and 113b. However, due to the fact that the auxiliary coil 114 is located on the stator at a point where the current flow in the member 113 due to the coil 114 is displaced 90° from the start winding, the current through the bimetal member 113, the total current, and the heating effect, will be the same in each leg 113a and 113b.

While the triac 107 is conducting, start winding current flows both through the branch including the triac 107 and the resistor 112, and through the branch including the resistor 118 and the bimetal member 113. The proportions of the start winding current flowing through these two branches may therefore be adjusted by an appropriate selection of the relative resistances in the two branches to obtain the desired amount of current through the member 113 and the speed of opening of the contacts. This is conviently accomplished by means of the resistors 112 and 118. The two resistors 112 and 118 may be part of the internal motor winding resistance and/or external resistors.

FIGS. 9 to 13 illustrate an alternate and preferred mounting arrangement of the electrical components of a control circuit in a capsule. The control circuit shown in FIG. 1 corresponds to the circuit illustrated in FIGS. 9 to 13.

The capsule is designed to be mounted in an electric motor including an upper end bell 120, an annular end ring 121, and a cylindrical outer shell 122. The ring 121 and the shell form parts of the motor stator which further includes stator windings 123 and a cylindrical inner liner 124. The end bell 120 is secured to the end ring 121 by mounting studs 126 and it supports a motor shaft 127. A spline seal 128 and rotary shaft seal 129 are mounted on the end bell 120 and engage the shaft 127. An outer corrosion resistant cover 131 is fastened to the exterior of the end bell 120 to protect the end bell from corrosion. Further, the end bell supports a shaft bearing 132 and an O-ring 133.

A longitudinally extending hole 136 (FIGS. 9 and 10) is formed through the end ring 121, and a blind hole 137 is formed in the end bell 120 in alignment with the hole 136. The end of the hole 136, which is in the cavity of the stator, is enlarged or counter sunk as indicated at 138. A capsule 141, shown in detail in FIGS. 11 and 12, is mounted in the hole 136 and extends into the blind hole 137.

Figure 10:
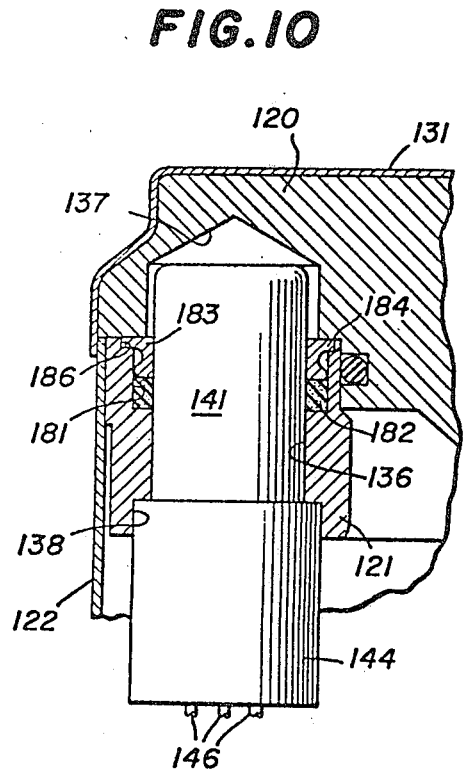
FIG. 10 is an enlarged view of part of the motor shown in FIG. 9.
Figure 9:
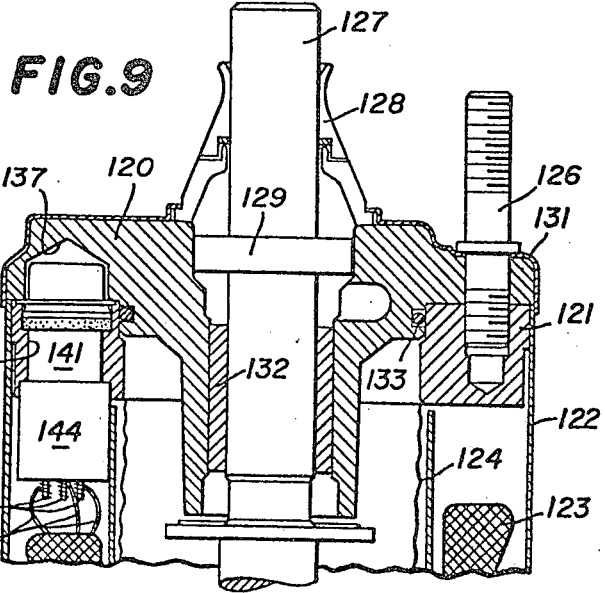
FIG. 9 is a sectional fragmentary view of a motor including a control circuit in accordance with another embodiment of the invention.
Figure 12:
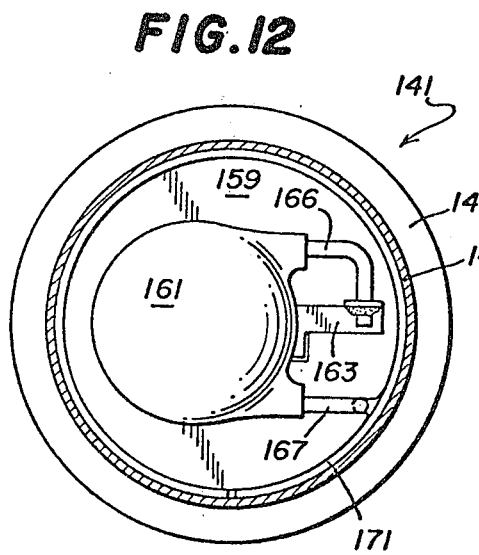
FIG. 12 is a sectional view taken on the line 12—12 of FIG. 11.
Figure 11:
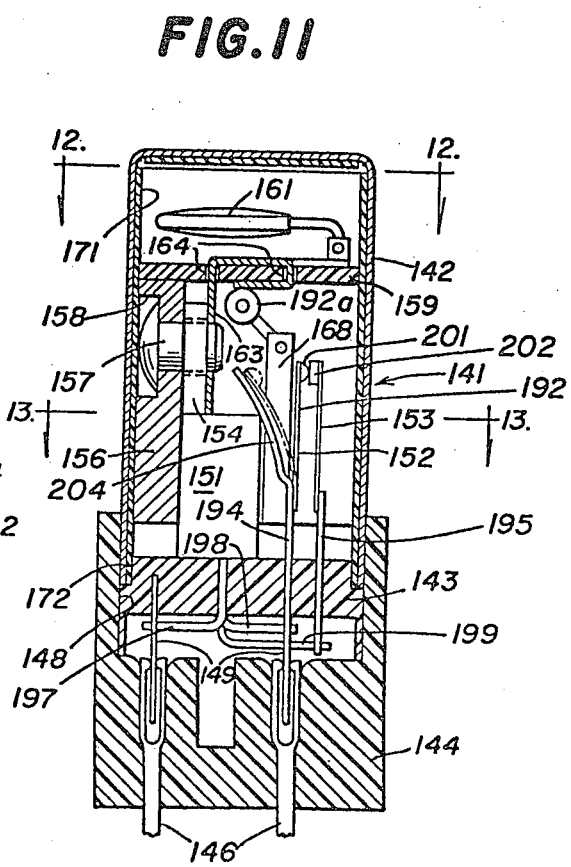
FIG. 11 is a sectional enlarged view of the control circuit of the motor of FIG. 9.

With reference to FIGS. 11 and 12, the capsule 141 includes an inverted cup-shaped housing or enclosure 142 which is made of a metal having good heat conducting properties. The lower end of the housing 142 is supported by a base 143 and a connector part 144, both of which are made of an electrical insulating material. The upper end of the part 144 is secured in the counter sink 138 as shown in FIGS. 9 and 10. Three sockets 146 are mounted on the part 144, and wires 147 connect the lower ends of the sockets 146 to the motor windings. The sockets 146 of course correspond to the sockets 41 to 43 shown in FIGS. 2 and 5. The upper side of the part 144 is recessed as indicated at 148, and the recess 148 snugly receives the base 143.

The base 143 supports the components of the control circuit. Three prongs 149 (only two shown in FIG. 11) similar to the prongs 61 to 63, extend downwardly from the underside of the base 143 and engage the sockets 146. A projection and slot arrangement (not shown) may be provided to properly align the prongs 149 and the sockets 146, similar to the projection 49 and the slot 48. On the upper side of the base 143 are mounted a triac 152, a U-shaped bimetallic heat-responsive member 152, and a contact member 153, which correspond and are similar to the members 16, 22 and 29. The bimetal member 152 has two legs 191 and 192 (FIG. 13) which are respectivey secured to supports 193 and 194. The supports 193 and 194 extend downwardly from the base 143 and form two of the prongs 149. The contact member 153 is secured to a support 195 which also extends downwardly from the base 143. The triac 151 includes three downwardly extending leads 196, 197 and 198 which respectively form the first and second power terminals and the gate of the triac 151. The leads 197 and 198 are connected to two of the prongs 149 and the lead 199 is connected to the support 195. At their upper ends, the members 152 and 153 respectively carry normally closed contacts 201 and 202. The triac 151 further includes a mounting tab 154, and a heat sink 156 is secured to the tab 154 by a rivet 157. Holes are formed in the tab 154 and the sink 156 for the rivet, and the sink hole is countersunk at 158 such that the head of the rivet will be generally flush with the outer surface of the sink 156.

Above the heat sink 156 is a disc 159 which is made of an insulating material and supports a snubbing capacitor 161 and resistor 162. A lead 163 is secured to the rivet 157 and is folded through holes 164 formed to the disc 159, thus holding the disc in place on top of the sink 156. One lead 166 (FIG. 12) of the capacitor 161 is connected to the lead 163, the other lead of 167 of the capacitor is connected to one side of the resistor 122, and the other side of the resistor is connected by a conductor 168 to the lead 199 of the triac 151.

The inner surface of the housing 142 is electrically insulated from the components of the control circuit by a thin liner 171 of the insulating material. In the present instance, the line 171 consists of a thin film of plastic insulation sold under the trademark Kapton which has an electrical insulating rating of 5500 to 7000 volts per mil and a thermal conductivity of 0.004 watts per square inch per degree centrigrade. This film thus possesses good heat transfer characteristics and high dielectric characteristics, as well as good physical strength. The liner 171 includes a rectangular sheet which is folded against the inner surface of the cylindrical part of the housing 142, and a circular sheet which is positioned against the inner surface of the upper end of the housing.

With reference to FIG. 11, the outer periphery of the base 143 is recessed adjacent its upper surface, as indicated at 172. The lower end edges of the housing 142 and the liner 171 fit snugly in the recess 172 and against the inner surface of the recess 148 of the part 144. The outer diameter of the disc 159 is slightly less than the inner diameter of the liner 171, so that the disc 159 fits snugly in the liner. The outer surface of the sink 156 has an arcuate shape, similar to the sink 74, and its radius is approximately equal to the radius of the inner surface of the liner 171.

It is advantageous to have the sink 156 held tightly against the liner 171 so that there will be good heat transfer from the sink 156, through the liner 171, to the housing 142. This is attained in the following manner. The triac 151 is securely fastened to the base 143 and supports the sink 156 which has a thickness such that it fits snugly between the triac 151 and the liner 171. Further, the lead or conductor 163 connecting the tab 154 with the disc 159 is quite stiff due to its width and thickness, as shown in FIGS. 11 and 12. As previously mentioned, the lead 163 is tightly connected to both the disc 159 and the tab 154, and the outer peripheries of the disc 159 and the sink 156 are flush with each other. As a consequence, the disc 159 by fitting snugly inside the liner 171, holds the upper end of the tab 156 tightly against the liner 171. Therefore, the disc 159 at the upper end of the sink and the snug fit of the housing 142 between the base 143 and the part 142 adjacent the lower end of the sink, cooperate to maintain the sink 156 tightly against the liner 171. A good heat conduction path is thereby established from the triac 151, through the sink 156 and the liner 171, to the housing 142 and the end ring 121.

The bimetallic member 152 is mounted closely adjacent the triac 151 and the triac acts as a heat sink for heat radiated by the member 152. The member 152 is designed to bend in the direction of the triac 151 when it is heated, as shown by the dashed lines position of the member 152 in FIG. 11, and consequently, the amount of heat lost by the member 152 to the triac 151 increases as the member 152 is heated. This is very important because it serves to protect the member 152 against damage that might be caused by overheating. Further, this location and direction of bending of the member 152 helps to maintain a balance, during operation of the motor, between the amount of heat generated by the member 152 and the amount of heat dissipated by the member 152 to the surrounding parts, such that the member 152 will be maintained out of engagement with the contact 153 but will not be damaged by overheating.

Figure 13:
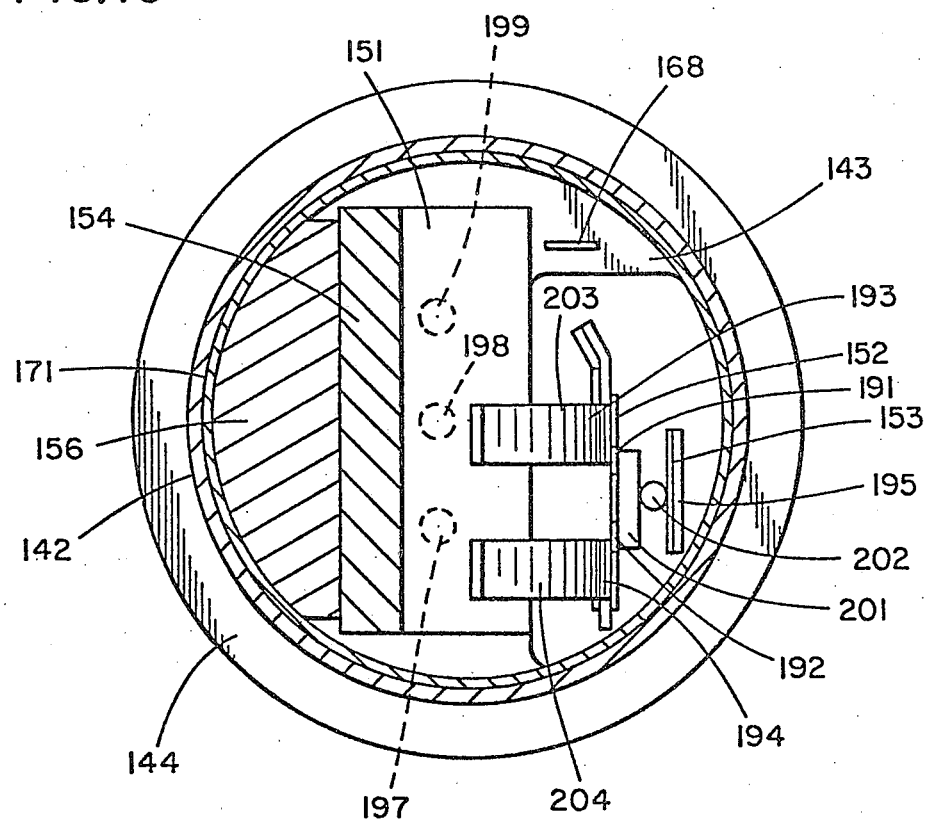
FIG. 13 is a sectional view taken on the line 13—13 of FIG. 11.

It was previously mentioned that additional heat sinks may be provided to draw heat from the bimetal member 152. FIGS. 11 and 13 illustrate two such heat sinks which are formed by upward extensions 203 and 204 of the supports 193 and 194 for the bimetal member 152. As shown in FIG. 11, the extensions 203 and 204 curve upwardly and toward the triac 151, and the curvature corresponds generally to that of the bimetal member 152 when it is heated. Consequently, when the member 152 bends when it is heated, it more closely approaches the extensions 203 and 204, and the amount of heat lost to the extensions 203 and 204 increases as the bend increases. The extensions 203 and 204 therefore form heat sinks which increase in effectiveness as the temperature of the bimetal member 152 increases.

The surfaces of the extensions 203 and 204, on the side toward the bimetal member, is preferably provided with a layer of insulation. The surfaces may be given a coating of varnish, or a thin sheet of insulating material similar to the liner 171 may be interposed between these parts.

The capsule is mounted in the hole 136 in the end ring 121 as previously mentioned, and a water tight seal is provided between them to prevent any leakage of liquid through the hole 136 into the stator cavity. This is important in the case of a submersible motor for a water pump. In the present instance, the seal is provided by enlarging the upper end of the hole 136 as indicated at 181 and positioning an annular resilient seal member 182 at the bottom of the enlargement 181. A metal sealing ring 183 is pressed into the enlargement 181 over the member 182, and the lower surface of the end bell 120 holds the ring 183 in place. The ring 183 has an enlarged rim 184, and the enlargement 181 is recessed at 186 to receive the rim 184. The upper surface of the rim 184 is substantially flush with the upper surface of the end ring 121 and it is engaged by the lower surface of the end bell 120 to hold the ring 183 in place.

FIG. 14 illustrates another form of control circuit, used in a motor including a main winding 211 and a start winding 212. The control circuit is similar to that of FIG. 1, and includes a triac 213, a bimetal member 214 and a fixed contact 216. A snubber resistor 217 and a capacitor 218 may be connected across the triac 213. The power or main terminals of the triac are connected in series with the start winding 212, and the gate of the triac is connected to the fixed contact 216. The legs of the bimetal member 214 are connected across a sensor coil 221. One leg is connected to one side of the coil 221 and the other leg and the other side of the coil are both connected to a line 222 which runs from the start winding 212 to the triac 213. Thus, current flow induced in the coil 221 flows through the gate circuit of the triac 213, by way of the bimetal member 214 and the fixed contact 216.

The sensor coil 221 is wound concentrically with the start winding 212, and it is preferably wound in the same stator slots as the winding 212. An insulation breakdown problem is thereby avoided because both ends of the coil 221 are at close to the potential of the start winding 212. The operation of the circuit is otherwise the same as that of the FIG. 1 circuit.

When a motor including a control circuit as shown in FIG. 1 or FIG. 14 is started up, a voltage is induced in the sensor coil, as previously explained, and the sensor coil voltage is applied across the bimetal member. The amount of heating current in the bimetal member will therefore be directly proportional to the coil voltage. The magnitude of the voltage is a function of the motor speed, and it increases from a low value of, for example, 0.14 volt up to, for example, 0.48 volt. The voltage differential will therefore be about 0.34 volt.

The magnitude of the voltage applied to the bimetal member, and also the amount of the voltage differential, may be modified by connecting a resistor 223 (FIG. 14) to the line 222 between the start winding 212 and the triac 213, the coil 221 being connected between the winding 212 and the triac 213. The voltage applied to the bimetal member 214 will be equal to the vector sum of the voltage induced in the coil 221 and the potential across the resistor 223. In a specific example where the voltages are vectorially added, the bimetal voltage increases from approximately 0.55 volt up to approximately 0.67 volt. Thus, a desired magnitude of the voltage and the voltage differential may be obtained by a proper choice of the number of turns of the sensor coil and the size of the resistor 223. The sensor coil and resistor voltages may be subtracted instead of added by reversing the direction of winding of the coil 221. The resistor 223 is quite small and may be added simply by increasing the length of the lead between the winding 212 and the bimetal member 214.

Figure 16:
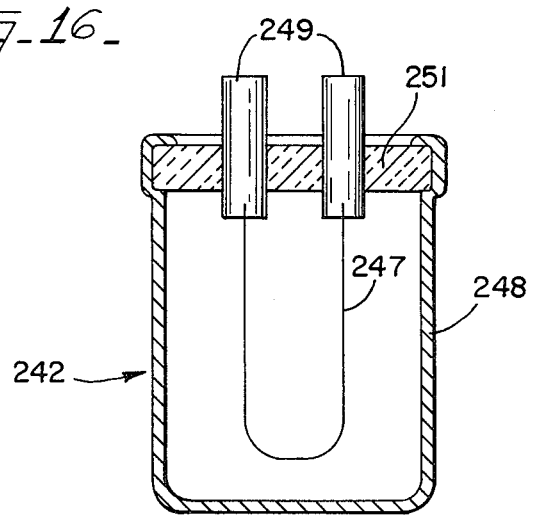
FIG. 16 is a sectional view of a component of the construction shown in FIG. 15.

The preferred form of the invention, shown in FIGS. 15 and 16, is generally similar to the form shown in FIG. 14. The main winding 231 and the start winding 232 of a motor are connected to AC power lines 233 and 234. A triac 236 is connected in series with the start winding, and the gate 237 is connected to a stationary contact 238 associated with a self-heating, heat responsive member 239. As in other forms of the invention, the member 239 is preferably a U-shaped bimetal member. The legs of the member 239 are connected in series with a current source 241 and a ballast resistor unit 242, the ends of this series circuit being connected to a line 243 that extends between the start winding 232 and the triac 236. The current source 241 comprises a coil which is wound on the motor stator on the same axis as the start winding 232.

A snubbing resistor 244 and a capacitor 245 are preferably connected across the triac 236.

The ballast resistor unit 242 is better shown in FIG. 16, and comprises a resistor element 247 mounted in a container 248. The element 247 has terminals 249 secured to its ends for use in connecting the element to the coil 241 and the member 239. The container is cup shaped and an insulator 251 seals the opening of the cup, the terminals 249 being embedded in the insulator.

The element 247 has a very high thermal coefficient of resistivity, and as a specific example, it consists of approximately one and one-fourth inches of #30 nickel iron alloy (70% Ni and 30% Fe) wire.

It is important that the element 247 be surrounded by air, and FIG. 16 illustrates an arrangement where this may be attained and the unit 242 may nevertheless be encapsulated in the motor stator. The insulator 251 seals the container 248 and prevents the stator potting compound from reaching the element 247.

The circuit shown in FIG. 15 operates generally similar to the circuit of FIG. 14 at low voltage and current levels in the coil 241. The element 247 is self heated by current flowing through it, and at low current levels, little heating takes place. Consequently, the element 247 will have a very low resistance and little effect on the heating current flowing through the member 239. At motor startup, the start winding 232 is energized and current is induced in the coil 241, which flows through the member 239 and causes it to heat up as previously described. At low voltage and current levels in the coil, the current flow is not high enough for the element 247 to materially change its resistance. After the start winding is cut out, current will continue to be induced in the coil 241 due to rotation of the motor, and this current is sufficient to keep the member 239 heated. If the motor stalls, current will no longer be induced in the coil 241, the member 239 will cool off, and the control circuit will reset and again connect the start winding 232 to the power supply lines.

Under certain conditions, there is a danger that the member 239 would be damaged by overheating if the unit 242 were not present. When the coil 241 is located on the axis of the start winding 232, the control circuit will have the desired resetting characteristics but it is also susceptible to wider variations in the voltage induced in it. Excessive voltages may occur in the coil 241 during light load operation and during high power line voltage levels, and the coil 241 voltage may have a 3:1 variation. Various means are described herein to protect the bimetal element 239 from damage due to overheating at high coil voltage levels, such as the use of heat sinks, mounting the coil between the main and start windings, and the resistor 223 (FIG. 14). The ballast resistor 247 provides this protection in a simple, inexpensive and reliable manner. At high voltage and current levels in the coil 241, the increased current flow through the resistor element 247 heats it which causes its resistance to increase and to limit the current level through the bimetal member 239 to a safe value. The described example of the resistor element 247 provides safe current levels over a 3:1 variation in coil voltage, and a longer and larger element would provide protection over a wide range of voltages.

In the control circuits disclosed herein, the start winding is deenergized when the bimetal member is heated to a certain temperature. The length of time required for the bimetal member to reach the cut-out temperature is a function of the ambient temperature; the number of heat units added to the member (which is related to the sensor coil voltage); the mass of the member; and the number of heat units lost by the member (radiating surface area and the presence of heat sinks). The foregoing factors may be chosen or adjusted to make the member reach the cut-out temperature at a desired time period, which is substantially constant, after initial energization of the motor, or when the motor has attained a desired speed. Since the bimetal member heats quite rapidly, relatively little heat is lost during motor start-up; therefore, the important design factors are the coil voltage and the mass of the bimetal member. If the mass is made very small, the coil voltage will be the dominate factor, and the coil voltage is a function of the motor speed. When using the circuit shown in FIG. 15, the sensor coil voltage is very small at low motor speeds, and little heating of the bimetal member takes place until the motor approaches running speed. Therefore, if the mass is very small, the cut-out temperature will be reached at a certain sensor coil voltage (or motor speed), and the control circuit may operate similar to a speed sensitive circuit. On the other hand, if the mass of the bimetal member is made relatively large and there is a relatively small coil voltage differential, the mass will be the dominate factor. A certain length of time will be required to heat this mass, and consequently, the control circuit will be time sensitive.

Making the control circuit speed sensitive has an advantage where the motor may be required to start up under a heavy load, since the motor will reach running speed before the start winding is disconnected. Another advantage is that, if the motor has been running and is switched off, the bimetal member will start to cool. If the motor is turned on again before the switch contacts close, there will be a low sensor coil voltage; the low mass of the bimetal member cools quickly and recloses the switch in order to accelerate the motor. However, the bimetal member will not immediately be heated to the cut-out temperature because of the low sensor coil voltage at low speed. The contacts will remain closed until the motor again reaches running speed.

It will be apparent from the foregoing description that novel and useful motor start winding control arrangements have been provided. The circuits described herein use a relatively small number of components and the components are relatively inexpensive and reliable. Further, the disconnection of the switch and consequent deenergization of the start winding occurs very rapidly and does not result in half wave operation of the motor. Still further, the circuit components may be conveniently packaged and installed in an electric motor at a location where they may be readily removed for inspection or servicing without disassembly of the entire motor. The capsule is mounted at a location where it is exposed to the ambient temperature and is not unduly influenced by the motor operating temperature.

The present constructions are particularly suited for use in motors which are required to be rapidly turned on and off. In such a motor, it is necessary that the bimetal element be heated very rapidly to disconnect the start winding during start up, and also that it cools rapidly upon deenergization of the motor so that the motor may be started again in a short time. Further, the bimetal member must not be overheated during continuous operation of the motor. The size and mass of the bimetal and the number of turns of the sensing coil, are selected to obtain the heating and cooling times necessary for a particular motor requirement. Another important factor affecting the heating and cooling of the bimetal is its proximity to heat sinks. In the present construction, the triac serves as a heat sink and the bimetal is mounted as closely as possible to the triac. In FIGS. 11 and 12, the bimetal is also mounted close to the extensions 203 and 204. The bimetal bends in the direction of the triac and the extensions when heated, thus absorbing more heat during continuous motor operation. In a specific example, the parts are sized and mounted to provide a rate of temperature rise in the range of 37° C. to 150° C. per second and a minimum temperature decay of 25° C. per second. In FIG. 15, the ballast resistor unit 242 prevents excessive voltages and the danger of overheating.

It should be understood that certain modifications may be made in the foregoing constructions without departing from the scope of the invention. For example, in both of the FIGS. 1 and 7 circuits, the auxiliary coils 31 and 94 may be wound concentrically with the start winding, or concentrically with the main winding, or at a location between the start and the main windings. In the circuit shown in FIG. 14, without the resistor 223, it has been found that mounting the coil 221 at approximately 70° from the main winding 211 provides some degree of protection against overheating damage.

Instead of providing detachable sockets 41 to 43 and prongs 61 to 63, leads having soldered or crimped connections, for example, could be provided between the capsule 44 and the stator windings and the auxiliary coil. Such connections are, of course, removable or detachable similar to the prong and socket connections illustrated in the drawings, so that the capsule may be removed when desired. Instead of providing a U-shaped bimetallic element, a plain strip of bimetal could be used by adding a shunt connected to the contact, which would serve as a return path for current flowing through the bimetal element. The liner 171 could be in the form of a coating on the inner surface of the housing 142, instead of separate films as described.

I claim:

1. A start winding cut-out circuit for an AC electric motor including a stator, a main winding and a start winding, said main winding being adapted to be connected across AC power supply lines, said circuit comprising an electronic switch having a pair of power terminals and a gate which closes said switch in response to triggering current appearing thereon, said power terminals and said start winding being connected in series and connected across said main winding, timing means operating through a timing interval during current flow therethrough, said timing means being connected to said gate and forming a source of trigger current to said gate, and an auxiliary coil wound on said stator and adapted to have a voltage induced therein, said auxiliary coil being connected to provide said current flow through said timing means to provide said trigger current for said time interval after initial energization of said motor.

2. A circuit as in claim 1, wherein said coil is wound on the axis of said start winding.

3. A circuit as in claim 1, wherein said coil is wound on the axis of said main winding.

4. A circuit as in claim 1, wherein said coil is wound between said start and main windings.

5. Apparatus as in claims 2, wherein said coil and said trigger means are connected to one side of said start winding.

6. Apparatus as in claim 1, and further including resistances means connected in series with said coil and said trigger means.

7. A circuit as in claim 4, wherein said coil is substantially seventy electrical degrees from the main winding.

8. A start winding cut-out circuit for an AC electric motor including a stator, a main winding and a start winding, said main winding being adapted to be connected across AC power supply lines, said circuit comprising an electronic switch having a pair of power terminals and a gate which closes said switch in response to triggering current appearing thereon, said power terminals and said start winding being connected in series and connected across said main winding, trigger means connected to said gate and forming a source of trigger current to said gate, an an auxiliary coil wound on said stator and adapted to have a voltage induced therein, said auxiliary coil being connected to and actuating said trigger means to provide trigger current for a time interval after initial energization of said motor, said trigger means being further connected to receive current flowing through said start winding during said time interval, said switch means thus responding both to current from said auxiliary coil and to start winding current.

9. A start winding cut-out circuit for an AC electric motor including a stator, a main winding and a start winding, said main winding being adapted to be connected across AC power supply lines, said circuit comprising an electronic switch having a pair of power terminals and a gate which closes said switch in response to triggering current appearing thereon, said power terminals and said start winding being connected in series and connected across said main winding, heat responsive switch means connected to said gate and forming a source of trigger current to said gate, said heat responsive switch means including a self heating part and switch contacts mounted on said part, said switch contacts being activated when said part is heated to a selected temperature, said switch means controlling the flow of trigger current to said gate, and a current source providing heating current to said switch means, said part being connected to receive current flow from said current source, said switch means providing said trigger current after initial energization of said motor until said selected temperature is reached.

10. A circuit as in claim 9, wherein said part comprises a bimetal member which heats and flexes in response to said heating current flowing therethrough, and said switch contacts include a movable contact which is moved by flexing of said bimetal member, and a fixed contact adjacent said movable contact.

11. A circuit as in claim 10, wherein said fixed and movable contacts are normally closed when said heat responsive switch means is cool, and said trigger current flows only while said contacts are closed.

12. Apparatus as in claim 9, wherein said heat responsive switch means has a relatively small mass and said current source supplied relatively little current at low motor speeds, whereby said selected temperature is reached at approximately a preselected motor speed.

13. Apparatus as in claim 9, wherein said heat responsive switch means has a relatively large mass and said selected temperature is reach after approximately a preselected time interval.

14. A start winding cut-out circuit for an AC electric motor including a stator, a main winding and a start winding, said main winding being adapted to be connected across AC power supply lines, said circuit comprising an electronic switch having a pair of power terminals and a gate which closes said switch in response to triggering current appearing thereon, said power terminals and said start winding being connected in series and connected across said main winding, heat responsive switch means connected to said gate and forming a source of trigger current to said gate, said heat responsive switch means including switch contacts which are activated when said switch means is heated to a selected temperature, said switch means controlling the flow of trigger current to said gate, and a current source connected to said switch means and providing heating current to said switch means, said switch means providing said trigger current after initial energization of said motor untill said selected temperature is reached, said heat responsive switch means comprising a bimetal member which heats and flexes in response to said heating current flowing therethrough, said switch contacts including a movable contact which is moved by flexing of said bimetal member and a fixed contact adjacent said movable contact, said bimetal member being generally U shaped, said current source being connected across the legs of said U, and said movable switch contact, being attached to the cross part of said U.

15. A start winding cut-out circuit for an AC electric motor including a stator, a main winding and a start winding, said main winding being adapted to be connected across AC power supply lines, said circuit comprising an electronic switch having a pair of power terminals and a gate which closes said switch in response to triggering current appearing thereon, said power terminals and said start winding being connected in series and connected across said main winding, heat responsive switch means connected to said gate and forming a source of trigger current to said gate, said heat responsive switch means including switch contacts which are activated when said switch means is heated to a selected temperature, said switch means controlling the flow of trigger current to said gate, and a current source connected to said switch means and providing heating current to said switch means, said switch means providing said trigger current after initial energization of said motor until said selected temperature is reached, said current source comprising at least one coil winding adapted to be wound on said stator of said motor.

16. A circuit as in claim 15, wherein said current source further comprises a connection from said start winding to said heat responsive switch means.

17. A circuit as in claim 15, wherein said connection is formed through said switch contacts which are closed at temperatures below said selected temperature, whereby start winding current flows to said switch means only at temperatures below said selected temperatures.

18. A start winding cut-out circuit for an AC electric motor including a stator, a main winding and a start winding, said main winding being adapted to be connected across AC power supply lines, said circuit comprising an electronic switch having a pair of power terminals and a gate which closes said switch in response to triggering current appearing thereon, said power terminals and said start winding being connected in series and connected across said main winding, heat responsive switch means connected to said gate and forming a source of trigger current to said gate, said heat responsive switch means including switch contacts which are activated when said switch means is heated to a selected temperature, said switch means controlling the flow of trigger current to said gate, and a current source connected to said switch means and providing heating current to said switch means, said switch means providing said trigger current after initial energization of said motor until said selected temperature is reached, said heat responsive switch means comprising a bimetal member which heats and flexes in response to said heating current flowing therethrough, and said switch contacts including a movable contact which is moved by flexing of said bimetal member; and a fixed contact adjacent said movable contact, said current source comprising an auxiliary coil wound on said motor and connected to said bimetal member.

19. A circuit as in claim 18, wherein said current source further comprises a connection from said start winding to said bimetal member, said connection including a resistor and said switch contacts, and current flow through said resistor resulting in a potential thereacross which results in said trigger current.

20. A circuit as in claim 19, wherein said coil is wound on said motor at a location where the current flow in said bimetal member caused by said coil is displaced substantially 90° from the current flow in said bimetal member caused by current flow from said start winding.

21. A circuit as in claim 19, and further including a second resistor connected in series with said electronic switch, the sizes of said two resistors being proportioned to produce a predetermined amount of heating current through said bimetal member.

22. A start winding cut-out circuit for an AC electric motor including a main winding and a start winding, said main winding being adapted to be connected across a pair of AC power supply lines, said cut-out circuit comprising an electronic switch having a pair of power terminals and a gate, a low resistance current path between said power terminals being selectively established when a potential is across said power terminals and trigger current appears on said gate, said start winding and said power terminals being adapted to be connected in series and across said power supply lines, and trigger current supply means connected to said gate and including a time delay switch means and an auxiliary coil, said coil being adapted to be wound on the stator of said motor and being connected to said time delay switch means, current generated in said coil during energization of said motor flowing to said time delay switch means, said time delay switch means being connected to said gate and to at least one of said power lines and forming a trigger current flow path to said gate, said time delay switch means when energized having a substantially constant time period during which trigger current flows to said gate along said flow path, said trigger current flow being interrupted at the termination of said time period, and said current generated in said coil flowing to and energizing said time delay switch means.

23. A control circuit for the start winding of an AC motor which also includes a stator and a main winding, said main winding being adapted to be connected across AC power supply lines, said control circuit comprising a triac including first and second main terminals and a gate, said main terminals being adapted to be connected in series with said start winding and connected across said supply lines, normally closed movable and fixed switch contacts, said fixed contact being connected to said gate, a U-shaped thermally responsive member, said movable contact being attached to the center portion of said member, one of the legs of said member being connected to one of said main terminals of said triac, and a current source connected across the legs of said member.

24. A control circuit for the start winding of an AC motor which also includes a stator and a main winding, said main winding being adapted to be connected across AC power supply lines, said control circuit comprising a triac including first and second main terminals and a gate, said main terminals being adapted to be connected in series with said start winding and connected across said supply lines, normally closed movable and fixed switch contacts, said fixed contact being connected to said gate, a U-shaped thermally responsive member, said movable contact being attached to the center portion of said member, one of the legs of said member being connected to one of said main terminals of said triac, and a current source connected across the legs of said member, said current source comprising a coil adapted to be wound on said stator.

25. A control circuit for the start winding of an AC motor which also includes a stator and a main winding, said main winding being adapted to be connected across AC power supply lines, said control circuit comprising a triac including first and second main terminals and a gate, said main terminals being adapted to be connected in series with said start winding and connected across said supply lines, normally closed movable and fixed switch contacts, said fixed contact being connected to said gate, a U-shaped thermally responsive member, said movable contact being attached to the center portion of said member, one of the legs of said member being connected to one of said main terminals of said triac, and a current source connected across the legs of said member, and further including a first resistor connecting said fixed contact with the other of said main terminals of said triac.

26. A control circuit as in claim 21, and still further including a second resistor connected in series with said triac and said start winding.

27. A control circuit for the start winding of an AC motor which also includes a stator and a main winding, said main winding being adapted to be connected across AC power supply lines, said control circuit comprising a triac including first and second main terminals and a gate, said main terminals being adapted to be connected in series with said start winding and connected across said supply lines, normally closed movable and fixed switch contacts, said fixed contact being connected to said gate, a U-shaped thermally responsive member, said movable contact being attached to the center portion of said member, one of the legs of said member being connected to one of said main terminals of said triac, and a current source connected across the legs of said member, a first resistor connecting said fixed contact with the other of said main terminals of said triac, a second resistor connected in series with said triac and said start winding, said current source comprising a coil wound on said stator at a location where it causes current flow in said thermally responsive member at a substantially 90° phase displacement from current flowing through said start winding, said first resistor and said member.

28. Apparatus for use in an electric motor including a stator, a start winding, and a run winding, comprising base means, circuit means connected to said start winding for controlling energization of said start winding, a thermally responsive member, said member being connected to actuate said circuit means, a current source, electrical conductors connecting said source with said member and supporting said member closely adjacent said base, said member flexing toward one side upon current from said source flowing therethrough, and heat sink means positioned adjacent said member on said one side, whereby said member flexes toward said sink when heated and heat is dissipated from said member to said base means and to said sink means.

29. Apparatus for use in an electric motor including a stator, a start winding, and a run winding comprising base means, circuit means connected to said start winding for controlling energization of said start winding, a thermally responsive member, said member being connected to actuate said circuit means, a current source, electrical conductors connecting said source with said member and supporting said member closely adjacent said base, said member flexing toward one side upon current from said source flowing therethrough, and heat sink means positioned adjacent said member on said one side, whereby said member flexes toward said sink when heated and heat is dissipated from said member to said base means and to said sink means, said sink means including an electronic switch.

30. Apparatus as in claim 29, wherein said sink further includes a heat absorbing and conducting sink member secured to said electronic switch.

31. Apparatus as in claim 30, and further including a housing enclosing said thermally responsive member and said heat sink means, said housing and said sink member being made of a good heat conduction metal, and further including a liner between said sink member and said housing, said liner being an electrical insulater and a heat conductor.

32. A start winding cut-out circuit for an AC electric motor including a stator, a main winding and a start winding, said main winding being adapted to be connected across AC power supply lines, said circuit comprising start winding switch means connected in series with said start winding and connected across said main winding, heat responsive switch means connected to actuate said start winding switch means, said heat responsive switch means including a self heating electrically conductive part which moves upon self heating, and switch contacts which are actuated by said movement when said part is heated to a selected temperature, said switch contacts being connected to and controlling actuation of said start winding switch means, and a current source connected to said part and providing heating current flow through said part, said current source being electrically coupled to the motor circuit and providing said heating current upon energization of said motor, and said switch means actuating said start winding switch means after initial energization of said motor until said selected temperature is reached.

33. A circuit as in claim 32, and further including ballast resistor means connected in series with said current source and with said self heating electrically conductive part.

34. A circuit as in claim 33, wherein said resistor means comprises a length of wire having a relatively high temperature coeeficient of resistivity.

35. A circuit as in claim 34, and further including a container, said wire being sealed in said container.

36. In an electric motor of the class including a stator, a motor, a main winding and a run winding mounted on said stator and separated by approximately ninety electrical degrees, and a start winding switch connected in series with said start winding, the switch normally connecting the start winding to the power lines only at motor start up, the combination thereof of an electrical self heating heat responsive means connected to actuate said switch, and a current source connected to supply heating current to said heat responsive means, said current source being electrically coupled to said start winding, and conductor means connecting said current source and said heat responsive means in series circuit.

37. The apparatus of claim 36, wherein said current source comprises a coil wound on said stator at an angle of approximately seventy electrical degrees from said main winding.

38. The apparatus of claim 36, wherein said current source comprises a coil wound on said stator substantially on the axis of said start winding.

39. The apparatus of claim 38, and further including a resistor connected in said series circuit, said resistor having a relatively high thermal coefficient of resistivity.

* * * * *